UNITED STATES PATENT OFFICE.

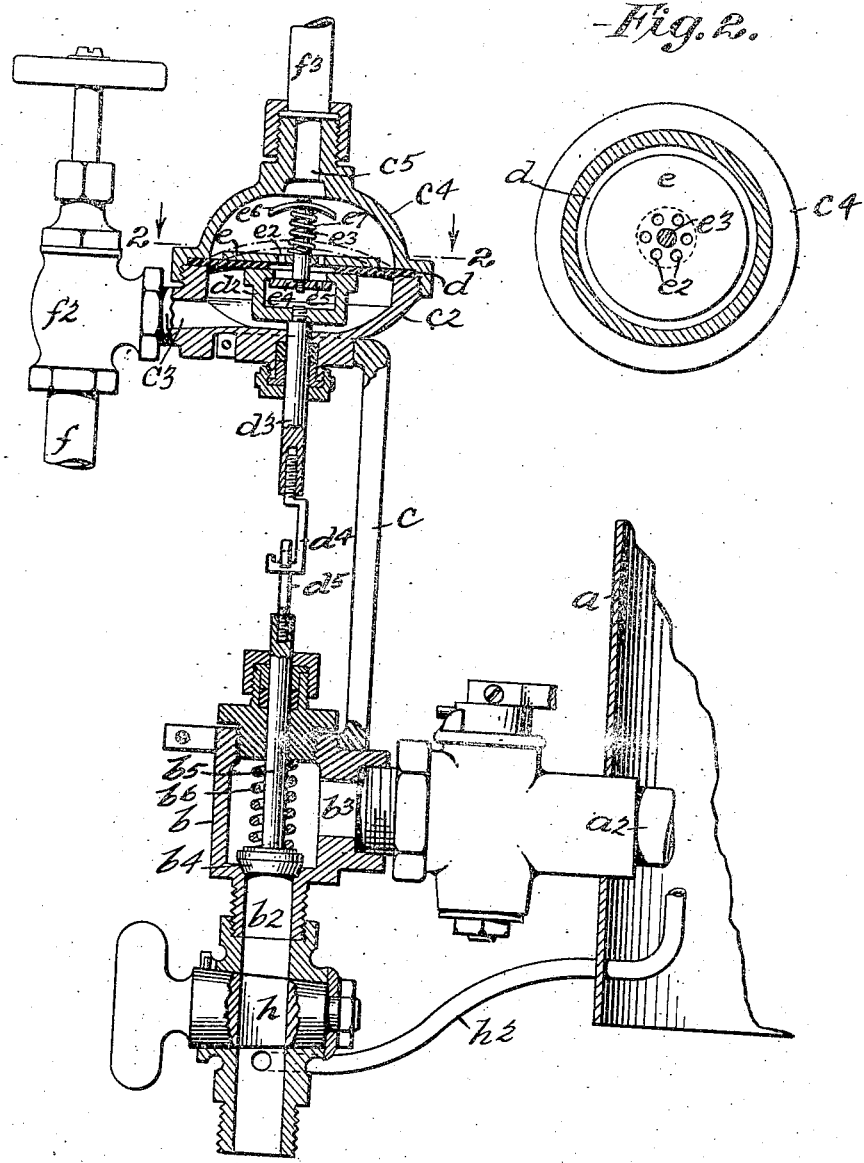

HERBERT J. LONG, OF NEW BRUNSWICK, NEW JERSEY.

AUTOMATIC VALVE.

1,055,478.  Specification of Letters Patent.  Patented Mar. 11, 1913.

Application filed June 1, 1911. Serial No. 630,590.

*To all whom it may concern:*

Be it known that I, HERBERT J. LONG, a citizen of the United States of America, and residing at New Brunswick, in the county of Middlesex and State of New Jersey, have invented certain new and useful Improvements in Automatic Valves, of which the following is a specification, such as will enable those skilled in the art to which it appertains to make and use the same.

This invention relates to valves, with particular reference to the use thereof in gas burning devices, such as water heaters and the like, and the object thereof is to provide means for operating such a valve through the medium of a fluid, said operation being automatically performed.

A further object is to operate the said valve by means of a diaphragm which is adapted to be flexed by the pressure of the fluid against the same.

A further object is to provide a valve in connection with said diaphragm which is adapted to be opened when the diaphragm is moved in one direction and closed in the other direction in order to permit the passage of the fluid therethrough.

A further object is to provide a permanent vent through the said diaphragm whereby the diaphragm may be returned to normal position after having been forced therefrom.

A further object is to provide a connection between the said diaphragm and the gas valve which permits of a certain degree of play or movement of the diaphragm previous to the opening of the gas valve; and further objects are to provide such automatically operated gas valves which are simple in construction, positive in operation, comparatively inexpensive and which avoid the possibility of the parts sticking together in such manner as to maintain the gas valve in open position when no fluid is passing through the automatic valve actuating device.

In all the automatic valves of this class now in use, and with which I am familiar, there is the constant possibility of movable parts, generally sliding, sticking together because of rust, corrosion, and the like, and also being rendered inoperative because of lead, scale, or other foreign matter lodging beneath or between such movable parts, with the result that the gas supply is not shut off when the water supply is closed off, this having resulted, on numerous occasions, in serious accidents, and it was to avoid this that my present invention was conceived and in which, even though the water supply valve which I employ should become inoperative by clogging or otherwise, the gas valve is still properly operated into closing position, the main reason being that I dispense with the usual plunger valves for the water supply, and I also carry my water supply valve on and with the diaphragm, thus not preventing diaphragm movement to close the gas valve when the water pressure is turned off, despite the presence of obstructing matter in the water valve.

My invention is fully described in the following specification, of which the accompanying drawings form a part, in which the separate parts are designated by the same reference characters in each of the views, and in which:—

Figure 1 is a central, vertical section taken through a valve constructed according to my invention and showing a fragment of the casing of a water heater with which it is adapted to be used: and Fig. 2 is a sectional plan view taken on the line 2—2 of Fig. 1.

The form of embodiment of my invention illustrated is intended for use in connection with that class of water heaters wherein the water passes from the main pipe through a coil within the heater casing and thence to the faucet of a wash-stand or the like and in which suitable gas burners are employed which are adapted to be ignited by means of a constantly burning pilot light when the water is turned on at the faucet, the said water causing a pressure against a movable element in connection with the main gas supply valve.

In the drawings forming a part of this application I have illustrated a portion of the casing $a$ of a water heater within which are arranged the coil of tubing, the main burners, and the pilot light, none of these parts being shown, however, as they form no part of this invention and may be of any well-known form of construction, the main burners being fed through a pipe $a^2$ having a valve $b$ arranged therein, said valve comprising a casing having inlet and outlet ports $b^2$ and $b^3$, respectively, and a disk valve $b^4$ seated above the port $b^3$, said disk having a stem $b^5$ connected therewith and being normally held upon its seat by means of a spring $b^6$.

Secured to the casing of the valve $b$ is a support $c$ which carries a casing at the upper end thereof, said casing comprising a cup-shaped lower member $c^2$ provided with an inlet port $c^3$ and a bell-shaped portion $c^4$ provided with an outlet port $c^5$, said members $c^2$ and $c^4$ being preferably held together by means of a suitable screw thread or the like and having a flexible diaphragm $d$ held therebetween, said diaphragm being provided with a relatively large central opening therethrough. Secured to the under side of the diaphragm $d$, in any suitable manner, is a yoke $d^2$ to which is secured a rod $d^3$ extending downwardly toward and in line with the valve stem $b^5$, said rod $d^3$ and valve stem $b^5$ being connected with each other by means of reversely arranged hooks $d^4$ and $d^5$, a certain degree of play being permitted between these hooks for a reason hereinafter pointed out, and the said hooks are preferably screwed into their respective rod or stem in order to adjust the degree of said play or lost motion.

Secured to the top of the diaphragm $d$ is a plate $e$ having a plurality of openings $e^2$ therethrough, and a rod $e^3$ is passed centrally therethrough and provided with a disk $e^4$ at the lower end thereof which serves as a valve for the opening through the diaphragm, and said disk is provided with a small vent $e^5$ which permits the passage of water therethrough at all times, the said rod $e^3$ being provided with a plate $e^6$ on its top adapted to strike the upper surface of the member $c^4$ of the casing in the upward flexing of the diaphragm, thus moving the disk $e^4$ from its seat and permitting the water to pass freely through the diaphragm in proportion to the degree of movement of said disk, and the said disk is normally held against its seat by means of a spring $e^7$.

The port $c^3$ of the member $c^2$ of the casing is in communication with a main water pipe $f$ which may have a valve $f^2$ therein if desired and at $f^3$ I have shown a pipe which passes into the casing of the heater and is coiled or otherwise arranged therein and thence to the point of use for the water.

A valve $h$ may be employed in the main gas supply pipe if desired, this being for a complete shutting off of the gas when it is not desired to use the heater, and a pilot light tube $h^2$ is in communication with the said main gas supply pipe at a point beyond the valves therein, this being for the purpose of permitting constant burning of the pilot light irrespective of the valve operation and, with the parts in the positions shown in the drawings, if the water should be turned on at the faucet and the pilot light be burning, the water is permitted to pass from the main supply pipe $f$ into the casing formed by the members $c^2$ and $c^4$, the pressure of the said water flexing the diaphragm and thereby operating the disk $e^4$ to permit the passage of water through the said diaphragm, this flexing resulting also in raising the disk $b^4$ from its seat and permitting the gas to pass through the casing $b$ on its way to the main burners where it is ignited by means of the pilot light. The water then passes through the diaphragm $d$, pipe $f^3$, and through the coils in the heater casing where the said water is heated and passes thence to the faucet, the parts being held in this alternate or open position just as long as the faucet is open, but when the faucet is closed there is no longer pressure beneath the diaphragm and it is returned to its normal position by means of its own elasticity and assisted by the spring $b^5$ when it forces the disk $b^4$ against its seat, this shuts off the main gas supply and the main burners are extinguished, the vent $e^5$ in the disk $e^4$ permitting sufficient water to pass therethrough to enable the diaphragm to resume its normal position, for it will be understood that with the faucet closed the pressure is equalized on both sides of the diaphragm and nothing prevents the diaphragm from returning to normal position.

In existing types of automatic gas valve operating devices it has been found that the parts stick together in their alternate position with the result that the gas valve is not closed when the outlet faucet is closed, thus permitting a waste of gas and resulting in a continuous heating of the water within the heater and which might result in an explosion because there is no outlet therefor, but with my device there are no parts to stick together, the diaphragm being the main operable element and this is freely moved at all times, and it has also been found that foreign substances will sometimes pass through the main water supply pipe and into the gas valve operating device and prevent a return of the parts to normal position, but in my device it would require a foreign substance of much greater size than could pass through the said water pipe to interfere in any way with the diaphragm movement and there is, therefore, no possibility of the gas valve being held in open position after the outlet faucet has been closed even though the diaphragm valve might be held open by foreign matter.

As hereinbefore stated a degree of play is permitted in the connection between the gas valve and the operating device therefor, the reason for which is that there is a greater degree of movement of the diaphragm movement than that of the gas valve, and this is readily adjusted at any time to insure seating of the gas valve before the diaphragm has resumed its normal position.

My invention is very simple and is positive in operation, entirely automatic, and perfectly safe and, while I have shown one form of embodiment thereof, it will be obvious that changes in and modifications of the same may be made and still be within the spirit of my invention, within the scope of the following claims and, reserving to myself the right to all such changes and modifications, what I claim as new and desire to secure by Letters Patent, is:—

1. The combination of a gas supply pipe, a valve therein, a water supply pipe, a casing in communication therewith, a diaphragm in said casing provided with a port therethrough, and operative connections between said diaphragm and gas valve, and a valve for said diaphragm port carried by said diaphragm and adapted to be opened when the latter has been forced to a position approximating its limit of movement by water pressure, said diaphragm being adapted to return to normal position to close said gas valve independently of the closure of the diaphragm valve.

2. The combination of a gas supply pipe, a valve therein, a water supply pipe, a casing in communication therewith, a diaphragm in said casing, in operative connection with said gas valve and having a valved port therethrough and movable therewith, said diaphragm being adapted to close said gas valve independently of the operation of said diaphragm valve, and external means for adjusting the moment of gas valve operation by compensating for the difference in degree of movement of said diaphragm over said gas valve.

In testimony that I claim the foregoing as my invention I have signed my name in presence of the subscribing witnesses this 22nd day of May 1911.

HERBERT J. LONG.

Witnesses:
GEORGE F. BENTLEY,
J. C. LARSEN.